March 10, 1970            F. J. PORT            3,499,228

METHOD OF DRYING ELECTRODES IN BATTERY CONTAINERS

Filed May 2, 1968            2 Sheets-Sheet 2

United States Patent Office 3,499,228
Patented Mar. 10, 1970

3,499,228
METHOD OF DRYING ELECTRODES IN BATTERY CONTAINERS
Frederick J. Port, Shaker Heights, Ohio, assignor to ESB Incorporated, a corporation of Delaware
Filed May 2, 1968, Ser. No. 726,067
Int. Cl. F26b 3/00
U.S. Cl. 34—22    4 Claims

ABSTRACT OF THE DISCLOSURE

A battery container having at least one opening at both the top and bottom of each cell compartment contains electrodes which are dried by passing a drying agent into the opening at one end of the cell compartment and out the opening at the other end of the cell compartment. Preferably the electrodes are assembled into elements and then charged before the drying occurs.

CROSS REFERENCE TO RELATED APPLICATION

This application is related to one filed concurrently with this application entitled "Battery Having Container in Two Portions and a Method for Making It," Ser. No. 726,068, filed May 2, 1968 in which I also am the inventor.

BACKGROUND OF THE INVENTION

This discussion concerns methods of drying charged battery electrodes. The discussion is equally applicable to multicell and single cell batteries and to rechargeable (secondary or storage) and nonrechargeable (primary) batteries.

In the construction of dry charged batteries there are three essential steps which must be performed: (a) the electrodes are charged; (b) the electrodes are dried; and (c) after the positive and negative electrodes have been alternately spaced into assemblies known as "stacks," the positive electrodes in the stack are mechanically and electrically connected together by a positive electrode connecting strap and the negative electrodes in the stack are mechanically and electrically connected together by a negative electrode connecting strap to produce asemblies known as "elements."

Except that step (b) above must always follow step (a), there is freedom of choice as to the sequence in which these steps are performed. Although the sequence (a), (c), (b) has not been popular, the patent literature contains several examples of both the sequence (a), (b), (c) and the sequence (c), (a), (b). For discussions of the sequence (a), (b), (c), see the following United States patents: 2,889,388; 3,038,018; 3,189,484; and 3,291,641. For discussions of the sequence (c), (a), (b) see the following United States patents: 2,887,522; 2,911,457; 3,038,018; 3,313,033; and 3,314,158. The following United States patents show the sequences (a), (b), (c) and (c), (a), (b) as being alternatives: 2,747,008; 2,978,-528; and 3,328,893. Some patents such as 2,911,457; 3,038,018; and 3,291,641 also discuss the disadvantages of older processes in which the steps were essentially (c), (a), (anti-c), (b), (c); that is, processes in which the electrodes were first assembled into elements before charging, subsequently disassembled for drying, and later reassembled, an obviously inefficient procedure. Among the advantages of the sequence (a), (b), (c) over the sequence (c), (a), (b) are the possibilities of obtaining better drying by having the wet electrodes spaced farther apart and of drying positive and negative electrodes in different manners, but the offsetting disadvantages include a much greater number of electrical connections and disconnections which must be made before and after charging as well as increased likelihood of damage to the electrodes when the electrodes are individually handled repeatedly.

The step of connecting the electrodes with connecting straps, step (c) above, may be performed either inside or outside the container. For reasons discussed in my cross-referenced application listed above, common practice in the automotive battery industry in the United States today is to apply the connecting straps outside the container, although it is advantageous to use the container as a fixture or jig for the stack wherever possible. For persons using the sequence (c), (a), (b), the already difficult problems of getting adequate drying of the closely stacked electrodes and separators have in the past been compounded if step (c) was performed inside the container where there subsequently would be poor circulation of the drying agent in the close confines of the container cell compartment. So serious was the problem of achieving adequate drying that of the patents listed above, only two—3,313,033 and 3,314,158—show drying of the electrodes being performed inside the container, and those two patents along with the others acknowledge the need for complete drying. It should be noted at this point that those two patents disclose drying processes in which the drying agent and the water vapor are removed from the cell compartment through the same opening, namely the open top of the container, as was used to introduce the drying agent into the cell compartments; in those two patents the drying agent, in addition to passing through the closely confined element, also reverses direction in order to get out of the cell compartments, resulting in poor circulation of the drying agent within the cell compartments and subsequently resulting in poor drying unless the drying process is carried out for long periods of time. Thus the processes shown in these two patents necessarily sacrifice much of the efficiency in drying which other processes (such as those shown in Patents 2,911,457; 3,038,018; and 3,328,893) are able to achieve by drying the stacks or elements outside the container with a drying agent which flows through the stacks or elements essentially in one direction rather than by reversing directions. The patents other than 3,313,033 and 3,314,158 show drying being done in a chamber (variously designated as a housing, oven, drier, tank, container, etc.), with racks to contain the electrodes sometimes being used while the electrodes are being transported through the chamber; the chamber is essentially a conduit used to convey the drying agent to, through, and from the wet electrodes, and neither the chamber nor the rack is a component of the final product as is the battery's container.

It should be noted that in the past a variety of drying agents, both gaseous and liquid, have been used to produce the drying. Gases are the more common drying agents (several different gases and mixtures thereof are shown in the following patents: 2,911,457; 3,038,018; 3,314,158; 3,313,033; and 3,328,893), with some gases being more suitable for drying plates of one polarity than for drying plates of the opposite polarity. For a process using a liquid drying agent, see U.S. Patent 2,747,008. Frequently the drying agents serve a second function during drying, that of a heating agent to supply heat to the electrodes.

SUMMARY OF THE INVENTION

With this invention the electrodes are dried while in the battery container by a drying agent which enters through an opening at one end of the container and leaves through an opening at the other end of the container. The electrodes may be present in the container during drying either as unconnected electrodes in stacks or as connected electrodes in elements; reverting to the discussion of the background, step (c) may be performed either before or after step (b). It is preferred to use the sequence (c), (a), (b) because electrodes may first be placed into the container, then connected to connecting straps, then charged, and then dried; the container is therefore used as a jig or fixture in steps (c), (a), and (b) and the number of electrical connections and disconnections required for charging is minimized. Both gaseous and liquid drying agents may be used. The drying agent may also serve as a heating agent. The invention combines the advantages realized by being able to use the container rather than a separate piece of equipment as a fixture or jig for the electrodes during formation and drying with the superior drying achieved by having the drying agent flow past the electrodes essentially in one direction rather than reversing directions. The invention is equally applicable to single cell and to multicell batteries. The invention is likewise equally applicable to rechargeable (secondary or storage) and non-rechargeable (primary) batteries.

DESCRIPTION OF THE PREFERRED EMBODIMENTS

Figure 2:
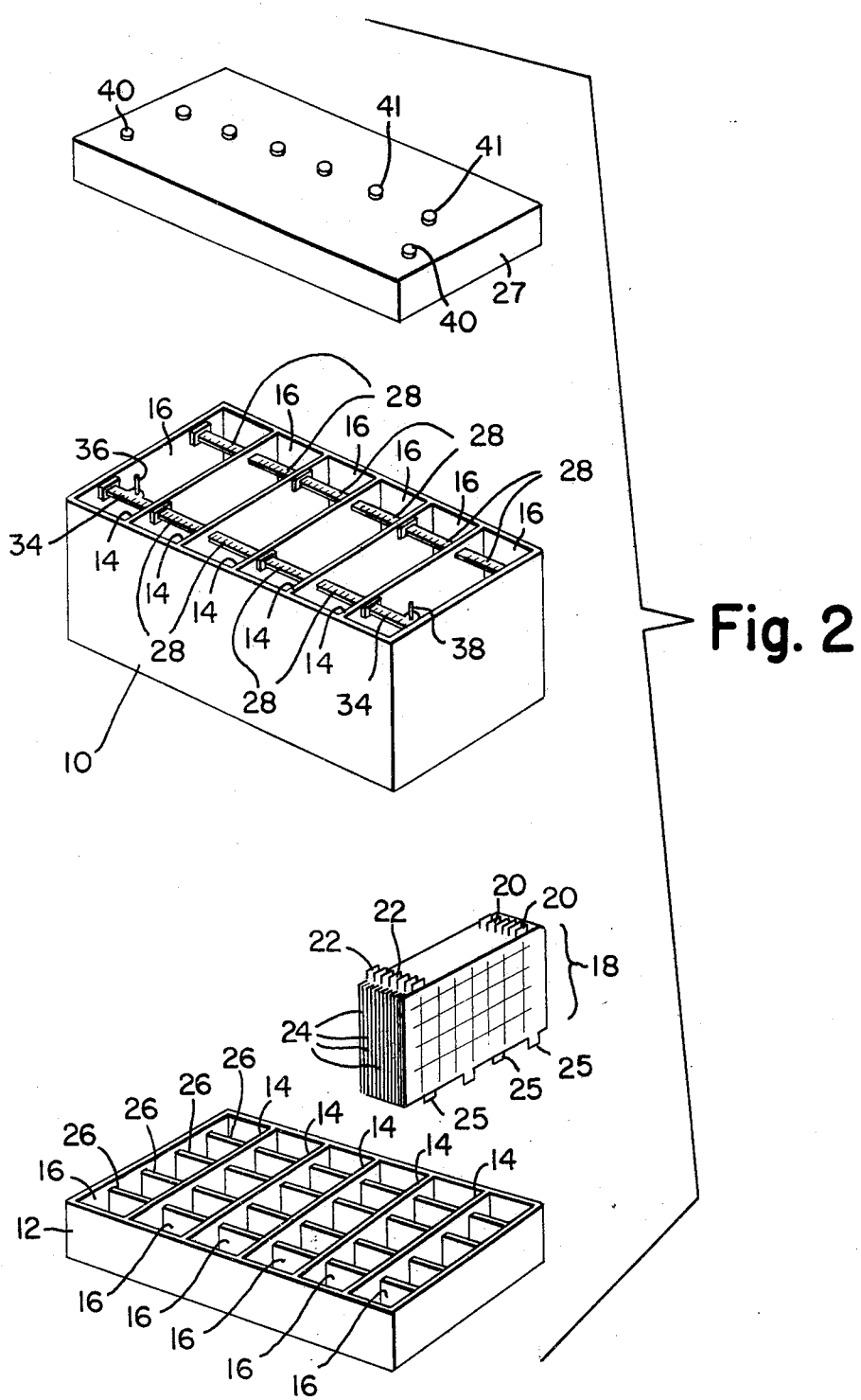
FIGURE 2 is an exploded view of a battery in which the container consists of two portions. The interior of the container is divided by partitions into six cell compartments. A stack of alternately spaced positive and negative electrodes for insertion into one of the cell compartments is also shown.

FIGURE 2, which also appears in my cross-referenced application, is useful in explaining one of the preferred embodiments of this invention. The figure illustrates components of a six cell battery made according to one of the methods claimed in my other application.

As shown in FIGURE 2, the container is divided into an upper portion 10 and a lower portion 12, each portion having partitions 14 which divide its interior into cell compartments 16. A separate cover 27 is provided for the container. The container is a component of the final product (the battery), with the upper portion providing its side walls and the lower portion providing its bottom after the two portions are subsequently sealed together; the cover constitutes the top to be placed over and sealed to the container. Into each cell compartment 16 is placed a stack 18 including alternately spaced positive electrodes 20 and negative electrodes 22. The stack could include only one positive and one negative electrode, but typically several electrodes of each polarity are included and it is common practice in the automotive battery industry for there to be one more negative electrode than positive electrode. These electrodes shown in FIGURE 2 are frequently referred to as "plates," perhaps because of their thin, flat, plate-like configuration; these characteristics are not essential requirements of the electrodes, however, either in automotive batteries or in batteries for other purposes, and the electrodes with which this invention is concerned could also be round, thick, or tubular in configuration. Where the electrodes are to be placed closely together it is customary to include insulating separators between adjacent electrodes as components in the stack to prevent adjacent electrodes from discharging against each other, but if the electrodes are to be spaced far apart or if some other means to prevent self-discharge can be devised then these separators are not essential components of the stack. Separators are common components of the stacks used in automotive batteries. The stack shown in FIGURE 2, which is typical of many of those presently used in automotive batteries, may be placed into one of the cell compartments of the upper portion of the container where two steps will then be performed: the electrodes will be connected to the connecting straps 28 and 24, and the wet, charged electrodes will be dried. These two steps may be performed in either of the two possible sequences, but with either sequence the electrodes of course must be charged before they can be dried.

While FIGURE 2 shows the strap connectors 28 extending through the partitions 14, a feature which is an essential limitation in my related invention, that feature is by no means necessary for purposes of this invention. For purposes of this invention, the strap connectors 28 could extend over rather than through the container partitions. For purposes of this invention it also is not a requirement that the one piece strap connector 28 extend into two adjacent cell compartments, although that condition is essential in my related invention; here there could be single cell strap connectors connected to the electrodes in each cell compartment, and those strap connectors could be electrically connected by a separate intercell connector extending over or through the partition which intercell connectors could be constructed by one of many different methods.

After the charged electrodes have been placed in the cell compartment of the upper portion of the container, the drying agent is passed into the opening at one end of the cell compartment and is removed through the opening at the other end of the cell compartment.

Figure 1:
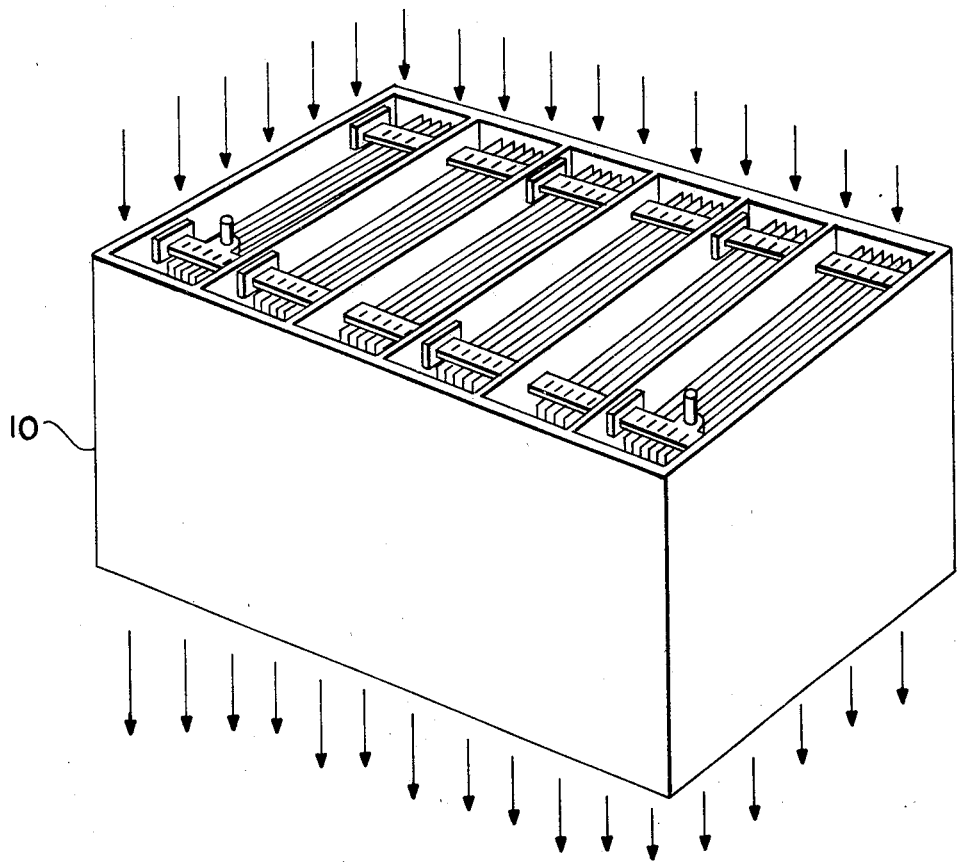
FIGURE 1 is a schematic view showing wet electrodes in the cell compartments of the upper portion of the container. Arrows indicate the direction of flow of a drying agent passing into the opening at one end of the upper portion of the container and being removed through the opening at the other end of the upper portion of the container.

Although one requirement of the present invention is that there be at least one opening at both the top and bottom end of the cell compartment in which the electrodes to be dried are located, it should be understood that there is flexibility in the concept of what constitutes an opening. The upper portion 10 of the container shown in FIGURE 2 constitutes one extreme illustration by showing both ends of the container being completely open; this arrangement is particularly advantageous because it permits the drying agent to flow rapidly through the upper portion of the container before the lower portion is sealed to the upper portion with the one-direction flow (see FIGURE 1) which has previously been obtained only where the electrodes were dried outside the container. Other arrangements are possible, however, which provide partial closures over one or both ends of the container. For a first alternative example, in my related application it is shown that the cover may be integrally constructed with the upper portion of the container if portals sufficient to permit access to the electrodes and connector straps are provided; such portals constitute openings at one end of the container. As another example, in conventional battery construction the container consists of one portion rather than as the two shown in this and my related application, and a separate cover having vent plug openings is applied to the container (FIGURE 2 shows vent plug openings 41 in the cover 27). If the vent plug openings were made in the bottom (bottom as of the time drying occurs; top when the battery is in use) of the container rather than in the cover, the vent plug openings would constitute an opening at the bottom end of the container. As still another example, the cover 27 shown in FIGURE 2 could be sealed to the upper portion 10 of the container before drying, and the vent plug openings 41 could serve as the required opening at the top of the container. The point to be made is that while there must be at least one opening in both the top and bottom of each cell compartment in the container, these openings may take a variety of sizes and shapes.

Although the discussion thus far has referred to the multicell batteries shown in the drawings, this invention is equally applicable to single cell batteries. In single cell batteries the interior of the container is a single cell compartment rather than being divided by partitions into two or more cell compartments, and the strap connectors do not extend from one cell compartment to another or are not so connected by intercell connectors, but otherwise all of what has been said above is applicable also to single cell batteries. The invention is likewise equally applicable to rechargeable (secondary or storage) and non-rechargeable (primary) batteries.

While the two inventions are essentially independent of each other, this invention may be conveniently used along with the invention disclosed and claimed in the cross-referenced related application listed above. In the other application a process is described in which the strap connectors extend through the partitions in the upper portion of a two-piece container and the electrodes are connected with the strap connectors inside the container, a process which is independent of how, where, and even if the electrodes are charged during the battery construction and which is also independent of how, where, and even if the electrodes are dried after being charged. While the upper portion of the container described in my other application is well suited for use with the invention of this application, the present invention can with equal ease be carried out using an upper portion of a container in which the connecting straps do not extend through the partition. It likewise is not essential for purposes of this invention that the container in all embodiments be constructed in two portions, the only essential requirement relating to container construction being that there is at least one opening at both the top and bottom of each cell compartment.

Returning to the discussion of sequences contained in the background above, it is preferred to use this invention with the sequence (c), (a), (b) and with the invention of the cross-referenced application. Using the upper portion 10 of the container in which the strap connectors extend through the partition, the stack is first placed into the upper portion of the container, the electrodes are then connected to the strap connectors, next the electrodes are charged, and finally the electrodes are dried by passing a drying agent into one end of the upper portion of the container and removing the drying agent through the other end of the upper portion of the container. The advantages of this process include the one-way flow of drying agent through the container; use of the container as a fixture or jig during each of the steps (c), (a) and (b); and reduction to a minimum of both the number of times electrodes must be individually handled and the number of electrical connections and disconnections required for charging.

I claim:

1. In a battery container, the container being a component of the battery as finally produced, the container having at least one opening at both the top and bottom ends of a cell compartment and having in that cell compartment charged battery electrodes which are to be dried, the method of drying the electrodes consisting of passing a drying agent into the opening at one end of the cell compartment and removing the drying agent through the opening at the other end of the cell compartment.

2. In a battery container consisting of an upper portion and a lower portion, the two portions being components of the battery as finally produced, the upper portion having at least one opening at both the top and bottom ends of a cell compartment and having in that cell compartment charged battery electrodes which are to be dried, the method of drying the electrodes consisting of passing a drying agent into the opening at one end of the cell compartment in the upper portion of the container, removing the drying agent through the opening at the other end of the cell compartment in the upper portion of the container, and subsequently sealing the two portions of the container together.

3. In a battery container having at least one opening at both the top and bottom ends of a cell compartment and having in that cell compartment battery electrodes which are connected to connecting straps, which are charged, and which are to be dried, the container being a component of the battery as finally produced, the method of drying the electrodes consisting of passing a drying agent into the opening at one end of the cell compartment and removing the drying agent through the opening at the other end of the cell compartment.

4. In a battery container consisting of an upper portion and a lower portion, the two portions being components of the battery as finally produced, the upper portion having at least one opening at both the top and bottom ends of a cell compartment and having in that cell compartment battery electrodes which are connected to connecting straps, which are charged, and which are to be dried, the method of drying the electrodes consisting of passing a drying agent into the opening at one end of the cell compartment, removing the drying agent through the opening at the other end of the cell compartment, and subsequently sealing the two portions of the container together.

References Cited

UNITED STATES PATENTS

| 2,911,457 | 11/1959 | Sabatino et al. | 136—33 |
| 3,038,018 | 6/1962 | Tiegel | 136—33 |
| 3,313,033 | 4/1967 | Carson et al. | 34—21 |
| 3,413,728 | 12/1968 | Tiegel et al. | 34—22 |

JOHN J. CAMBY, Primary Examiner

U.S. Cl. X.R.

136—33